United States Patent [19]

Coqueugniot et al.

[11] 4,255,243
[45] Mar. 10, 1981

[54] UNSATURATED POLY-(CARBONATE-URETHANES) AND THEIR APPLICATIONS TO PHOTOCROSSLINKING

[75] Inventors: Annick G. Coqueugniot; Robert J. Bruggeman, both of Ballancourt; Marc D. Piteau, Itteville, all of France

[73] Assignee: Societe Nationale des Poudres et Explosifs, Paris, France

[21] Appl. No.: 54,147

[22] Filed: Jul. 2, 1979

[30] Foreign Application Priority Data

Jul. 19, 1978 [FR] France ................... 78 21456

[51] Int. Cl.$^3$ .................... C08L 75/04; C08F 8/14
[52] U.S. Cl. .................... 204/159.15; 525/440; 525/453; 525/920; 528/75
[58] Field of Search .......... 525/455, 920, 440; 204/159.15; 528/75

[56] References Cited

U.S. PATENT DOCUMENTS

| | | | |
|---|---|---|---|
| 3,509,234 | 4/1970 | Burlant | 525/920 |
| 3,641,199 | 2/1972 | Niederhauser | 525/455 |
| 3,772,404 | 11/1973 | Knight | 525/920 |
| 3,891,523 | 6/1975 | Kisamatsu | 525/455 |
| 4,034,017 | 7/1977 | Chang | 525/440 |
| 4,097,439 | 6/1978 | Darling | 525/440 |
| 4,108,840 | 8/1978 | Friedlander | 525/455 |
| 4,112,017 | 9/1978 | Howard | 525/920 |

FOREIGN PATENT DOCUMENTS

48-42956 12/1973 Japan ..................... 525/455

*Primary Examiner*—Paul Lieberman
*Attorney, Agent, or Firm*—Bucknam and Archer

[57] ABSTRACT

The invention relates, by way of new products, to poly-(carbonate-urethanes) with acrylic or methacrylic acid terminal groups, of the formula

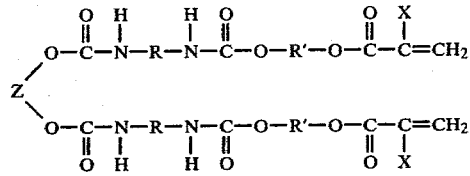

in which X represents either hydrogen or the methyl group, R represents a substituted or unsubstituted alkylene, cycloalkylene or arylene radical, R' represents a lower alkylene radical, Z represents a polycarbonate chain and C, H, N and O respectively represent carbon, hydrogen, nitrogen and oxygen.

The unsaturated poly-(carbonate-urethanes) according to the invention are obtained by condensing a diisocyanate with a polycarbonate-diol and a lower hydroxyalkyl acrylate or methacrylate.

They constitute a base for photocrosslinkable compositions which resist hydrolysis and possess a good adhesion.

7 Claims, No Drawings

UNSATURATED POLY-(CARBONATE-URETHANES) AND THEIR APPLICATIONS TO PHOTOCROSSLINKING

The present invention relates to photocrosslinkable compositions which can, for example, be used as a base for varnishes, paints and inks. More precisely, the present invention relates to new crosslinkable compositions based on poly-(carbonate-urethanes) with acrylic or methacrylic acid terminal groups.

The invention also relates, by way of new industrial products, to the poly-(carbonate-urethanes) with acrylic or methacrylic acid terminal groups.

Unsaturated oligomers constitute an essential base for products which must dry and harden under ultraviolet rays, such as varnishes, paints and inks. The photocrosslinkable materials which are usually employed in industry are polymers with acrylic acid, or optionally methacrylic acid, terminal groups, these terminal groups possessing the particular ability to crosslink under the action of natural or artificial ultraviolet rays. In general, these acrylic or methacrylic acid terminal groups are carried by a polymer of the polyurethane, polyester or epoxy type. One family of diols which is particularly used in this type of formulation is the family of the polyester-diols. Formulations of this kind are described, for example, in French Pat. Nos. 2,054,213, 2,170,463 and 2,197,932. Nevertheless, these formulations exhibit a significant disadvantage, namely a poor adhesion to a certain number of supports in particular to metal supports; this disadvantage is mentioned, for example, in German patent application DOS No. 2,531,180. A solution recommended in this application consists in employing, in the photocrosslinkable formulations, oligocarbonates of the general formula $$CH_2=(CX)-COORO+COOR'OCOOR''O\hspace{-0.5em}-\hspace{-0.5em}]_n\hspace{-0.3em}-COOR''OCOOROCOC(X)=CH_2$$

in which X represents either hydrogen or a methyl group, R, R' and R" represent hydrocarbon radicals and n is an integer which is either zero or greater than or equal to unity, but which, in the examples given, does not exceed the value 5. These products possess an improved adhesion to various supports but have mediocre physical properties which render them of little value for industrial use. Analogous compositions are also described in French Pat. No. 2,344,870.

The inventors have has now discovered that certain poly-(carbonate-urethanes) with acrylic or methacrylic acid terminal groups make it possible to obtain photocrosslinkable compositions which at the same time possess very good physical properties after crosslinking and a good adhesion to the main supports which are usually employed, in particular, to metal supports and organic supports. The photocrosslinkable compositions according to the invention furthermore possess an improved resistance to hydrolysis, compared with the conventional compositions.

The poly-(carbonate-urethanes) with arcylic or methacrylic acid terminal groups, according to the invention, correspond to the general formula:

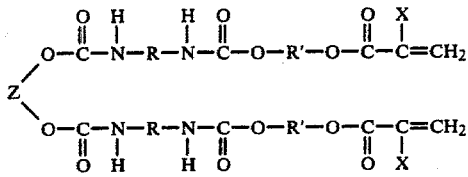

in which: X represents either hydrogen or the methyl group, R represents a substituted or unsubstituted alkylene, cycloalkylene or arylene radical, R' represents a lower alkylene radical, Z represents a polycarbonate chain originating from a hydroxytelechelating, aliphatic or cycloaliphatic, linear polycarbonate and C, H, N and O respectively represent carbon, hydrogen, nitrogen and oxygen.

A preferred family of poly-(carbonate-urethanes) with acrylic or methacrylic acid terminal groups, according to the invention, corresponds to the following general formula:

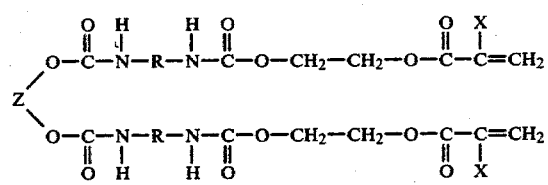

in which X, R, Z, C, H, N and O have the same meaning as above.

The poly-(carbonate-urethanes) with acrylic or methacrylic acid terminal groups, according to the invention, are obtained by condensing a hydroxytelechelating, aliphatic or cycloaliphatic, linear polycarbonate and a diisocyanate with a lower hydroxyalkyl acrylate or methacrylate of stoichiometric ratios. Two methods of preparation are possible. A first method consists of condensing the hydroxyalkyl acrylate or methacrylate with the diisocyanate, in a first stage, and in reacting the hydroxytelechelating polycarbonate with the product thus obtained. A second method consists in condensing the diisocyanate with the hydroxytelechelating polycarbonate, in a first stage, and in reacting the hydroxyalkyl acrylate or methacrylate with the product thus obtained.

The various commercially available aliphatic, cycloaliphatic or aromatic diisocyanates can be used. Examples which may be mentioned are hexamethylene diisocyanate, isophorone diisocyanate or 1-methyleneisocyanate-5-isocyanato-1,3,3-trimethylcyclohexane, 2,4-diisocyanatotoluene, 4,4'-diisocyanate-bis-cyclohexylmethane, 2,2,4-trimethylhexamethylene diisocyanate or methylene-bis-phenyl diisocyanate.

According to a preferred modified embodiment of the invention, diisocyanates in which the two functional groups NCO do not have the same reactivity, because of their different location on the molecule, are chosen, as is the case, for example, of isophorone diisocyanate or toluene diisocyanate.

Hydroxytelechelating polycarbonates which can be used are hydroxytelechelating, aliphatic or cycloaliphatic, linear polycarbonates which have a molecular weight of between 500 and 3,000 and are obtained by the phosgenation or transesterification of diols, or of a mixture of aliphatic or cycloaliphatic diols, such as, for example, butane-1,4-diol, butane-1,3-diol, pentane-1,5-diol, hexane-1,6-diol, heptane-1,7-diol, octane-1,8-diol, di-(ethylene glycol), tri-(ethylene glycol), cyclohexanediol, cyclohexanedimethanol, 2,2,4,4-tetramethylcyclobutane-1,3-diol and the like.

Hydroxyalkyl acrylates or methacrylates which can be used are various lower hydroxyalkyl acrylates or methacrylates, in particular hydroxyethyl acrylate or methacrylate.

The synthesis of the acrylic or methacrylic acid poly-(carbonate-urethanes) according to the invention is carried out at ambient temperature or at a moderate temperature which is preferably between about 40° and 70° C. In order to avoid undesirable crosslinking of the acrylic or methacrylic unsaturations, small amounts of stabiliser, that is to say a crosslinking inhibitor, are added to the reaction mixture. Stabilisers which may be mentioned are compounds such as phenothiazine or hydroquinone. If, at moderate temperature, the reaction mixture remains too viscous, it is possible to use an invert solvent such as, for example, a chlorinated aliphatic hydrocarbon like methylene chloride, chloroform or carbon tetrachloride. In order to be able to carry out the synthesis easily at ambient temperature or at a temperature slightly above ambient temperature, it is preferred to use hydroxytelechelating polycarbonates which are liquid at ambient temperature and are obtained by the phosgenation or transesterification of a mixture of at least two diols as described, for example, in French Pat. No. 2,349,612 in the name of the Applicant Company.

The acrylic or methacrylic acid poly-(carbonate-urethanes) according to the invention, which will be denoted by the term poly-(carbonate-urethanes) with acrylic unsaturations in the remainder of the text, make it possible to obtain photocrosslinkable compositions which at the same time possess very good physical properties after crosslinking and a good adhesion to the main customary supports, in particular to metal supports, such as aluminium or iron, and to organic supports, such as supports made of polycarbonates, polyvinyl chloride and polyurethane.

Other supports, such as wood or paper, can also be used with the photocrosslinkable compositions according to the invention. The photocrosslinkable compositions according to the invention permit easy spreading on the support and also possess an improved resistance to hydrolysis, compared with the conventional compositions.

The photocrosslinkable compositions according to the invention contain three main components, namely:

a poly-(carbonate-urethane) with acrylic unsaturations, constituting the base of the composition, an unsaturated monomer which is a reactive solvent for the poly-(carbonate-urethane) with acrylic unsaturations and makes it possible to lower the viscosity of the formulation, to correct the properties of the polymer, depending on the desired aim, and to increase the crosslinking rate, and a photoinitiator.

The unsaturated monomer is generally a polyfunctional acrylate of low molecular weight, such as, for example, pentaerythritol triacrylate, trimethylolpropane triacrylate, hexane-1,6-diol diacrylate or the like.

The photoinitiator is a compound which, under the action of ultraviolet radiation, leads to the formation of free radicals which then initiate the copolymerisation of the mixture of poly-(carbonate-urethane) which acrylic unsaturations and unsaturated monomer. Examples of customary photoinitiators which may be mentioned are benzoin ethers, such as benzoindimethyl ether of the formula

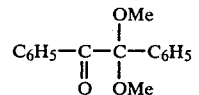

acetophenone derivatives, such as diethoxyacetophenone or p-tert.-butyl-trichloroacetophenone, and benzophenone, used in a mixture with an amine such as dimethylaminoethanol.

In practice, a forth component, that is to say the stabiliser, is generally required in order to increase the pot life and, in particular, to prevent the copolymerisation from starting under the action of the surrounding light radiation. Examples of conventional stabilisers which may be mentioned are hydroquinone, phenothiazine or p-hydroxyphenol.

The preparation of a photocrosslinkable composition according to the invention is carried out in accordance with the following procedure:

the poly-(carbonate-urethane) with acrylic unsaturations is melted at about 70° C., the chosen amount of unsaturated monomer is added, and the stabiliser is optionally added and mixing is started.

After total dissolution, the additives which are well known to those skilled in the art, such as, in particular, spreading agents, adhesion promoters and organic or inorganic pigments, are optionally added.

Examples of spreading agents which may be mentioned are silicone resins, polymethacrylates or vinyl acetate/vinyl chloride copolymers.

Examples of adhesion promoters which may be mentioned are unsaturated or epoxidised silanes.

A further mixing operation is then carried out so as to ensure that the photocrosslinkable composition is perfectly homogeneous, the composition then being ready for use after the addition of the photoinitiator. After spreading on the chosen support, the crosslinking is carried out either under the action of ultraviolet rays from natural light, or under the action of ultraviolet rays produced artificially, for example with the aid of a special lamp.

The method of carrying out the invention will be more clearly understood with the aid of the non-limiting examples given below.

EXAMPLE 1

87 grams (0.5 mol) of toluene diisocyanate and 0.027 g of phenothiazine are placed in a 500 cm³ reactor under a nitrogen atmosphere. The temperature is kept at between 48° and 50° C. and 58 g, that is to say 0.5 mol, of freshly distilled hydroxyethyl acrylate are added in the course of two hours. When the introduction is complete, the mixture is stirred for a further 3 hours at the same temperature and 223 g, that is to say 0.25 mol, of an aliphatic polycarbonate-diol are then added, the latter having a molecular weight of 890 and being obtained by the phosgenation of a mixture of butane-1,4- diol and hexane-1,6-diol in proportions which are such that the resulting polycarbonate is equivalent to a mixture of 50% by weight of a polycarbonate obtained from hexane-1,6-diol by itself and 50% by weight of a polycarbonate obtained from butane-1,4-diol by itself. The reaction is allowed to proceed for 3 hours at 50° C. A few drops of methanol are added in order to neutralise any free isocyanate groups which could have remained.

This yields a product having a level of conjugated unsaturation of 1.49 equivalents/kg for a theoretical level of 1.36. The product is in the form of a viscous oil.

EXAMPLES 2 to 7

The procedure of Example 1 is followed, the reactants used being the polycarbonate-diol of Example 1 and hydroxyethyl acrylate, and the diisocyanate being either toluene diisocyanate or isophorone diisocyanate. The operating conditions and the results obtained are shown in Tables I and II below.

TABLE I

| | | OPERATING CONDITIONS | | | |
|---|---|---|---|---|---|
| Example No. | Amount of polycarbonate | Amount of hydroxyethyl acrylate | Nature of the diisocyanate | Amount of diisocyanate | Reaction temperature |
| 2 | 667.5 g | 174 g | Toluene diisocyanate | 261 g | 65° C. |
| 3 | 667.5 g | 174 g | Toluene diisocyanate | 261 g | 65° C. |
| 4 | 223 g | 58 g | Toluene diisocyanate | 87 g | 75° C. |
| 5 | 882 g | 232 g | Toluene diisocyanate | 348 g | 75° C. |
| 6 | 222 g | 58 g | Isophorone diisocyanate | 103 g | 75° C. |
| 7 | 204.3 g | 58 g | Isophorone diisocyanate | 103 g | 75° C. |

TABLE II

| | | RESULTS | |
|---|---|---|---|
| | | Level of conjugated unsaturations | |
| Example No. | Weight obtained | Yield | Theoretical | Found |
| 2 | 1,050 g | 98% | 1.36 equivalents/kg | 1.60 equivalents/kg |
| 3 | 1,100 g | 98.4% | 1.36 equivalents/kg | 1.63 equivalents/kg |
| 4 | 365 g | 99% | 1.36 equivalents/kg | 1.65 equivalents/kg |
| 5 | 1,430 g | 98.1% | 1.36 equivalents/kg | 1.60 equivalents/kg |
| 6 | 365 g | 95.5% | 1.30 equivalents/kg | 1.35 equivalents/kg |
| 7 | 345 g | 98% | 1.30 equivalents/kg | 1.38 equivalents/kg |

EXAMPLE 8

The procedure of Example 1 is followed, the reactants used being toluene diisocyanate, hydroxyethyl acrylate and a polycarbonate-diol which has a molecular weight of 1,942 and is obtained by the phosgenation of a mixture of butane-1,4-diol and hexane-1,6-diol in proportions which are such that the resulting polycarbonate is equivalent to a mixture of 50% by weight of a polycarbonate obtained from hexane-1,6-diol by itself and 50% by weight of a polycarbonate obtained from butane-1,4-diol by itself. The operating conditions are as follows:
amount of polycarbonate: 1,295 g
amount of isocyanate: 386.7 g
amount of hydroxyethyl acrylate: 154.6 g
reaction temperature: 75° C.
weight of product obtained: 1,630 g
yield: 96.9%
level of conjugated unsaturations theoretical: 0.80 equivalent/kg; found: 0.82 equivalent/kg.

EXAMPLE 9

The procedure of Example 1 is followed, the reactants used being toluene diisocyanate, hydroxyethyl acrylate and a polycarbonate-diol which has a molecular weight of 980 and is obtained by the phosgenation of di-(ethylene glycol). The operating conditions are as follows:
amount of polycarbonate: 236.5 g
amount of isocyanate: 140 g
amount of hydroxyethyl acrylate: 58 g
reaction temperature: 75° C.
weight of product obtained: 371 g
yield: 98.5%
level of conjugated unsaturations theoretical: 1.28 equivalents/kg; found: 1.30 equivalents/kg.

EXAMPLE 10

0.2 mol, that is to say 35 g, of toluene diisocyanate is placed in a 250 ml reactor and 0.1 mol, that is to say 89 g, of the aliphatic polycarbonate-diol used in Example 1 is added in the course of two hours, the temperature being kept at 50° C. After the addition of the polycarbonate, the reaction is allowed to proceed to completion at 50° C., whilst stirring for one hour. 0.2 mol, that is to say 23.2 g, of hydroxyethyl acrylate and 0.18 g of hydroquinone are then added. The reaction is allowed to proceed at 65° C. for two hours. It is completed by adding 3 g of methanol so that any unreacted NCO groups disappear.

This yields 129 g of a product having a level of conjugated unsaturation of 1.64 equivalents/kg for a theoretical level of 1.42 equivalents/kg. The yield is 92%.

EXAMPLE 11

The procedure followed is as described in Example 10, the same reactants being used, except that the hydroquinone is replaced by phenothiazine, and the operating conditions being as follows:
amount of polycarbonate: 89 g
amount of isocyanate: 35 g
amount of hydroxyethyl acrylate: 23.2 g
reaction temperature: 60° C.
weight of product obtained: 135 g
yield: 92%
level of conjugated unsaturations theoretical: 1.36 equivalents/kg; found: 1.84 equivalents/kg.

EXAMPLE 12

The procedure of Example 10 is followed, the reactants used being toluene diisocyanate, hydroxyethyl acrylate and a polycarbonate-diol which has a molecular weight of 1,100 and is obtained by the phosgenation of a mixture of butane-1,4-diol and hexane-1,6-diol in proportions which are such that the resulting polycarbonate is equivalent to a mixture of 50% by weight of a polycarbonate obtained from hexane-1,6-diol by itself and 50% by weight of a polycarbonate obtained from butane-1,4-diol by itself. The operating conditions are as follows:
amount of polycarbonate: 110 g
amount of isocyanate: 35 g
amount of hydroxyethyl acrylate: 23.2 g
reaction temperature: 65° C.
weight of product obtained: 160 g
yield: 96%
level of conjugated unsaturations theoretical: 1.19 equivalents/kg; found: 1.55 equivalents/kg.

EXAMPLE 13

The procedure followed is as indicated in Example 12, the operating conditions being as follows:
amount of polycarbonate: 110 g
amount of isocyanate: 35 g
amount of hydroxyethyl acrylate: 23.2 g
reaction temperature: 65° C.
weight of product obtained: 155 g
yield: 92%
level of conjugated unsaturations theoretical: 1.19 equivalents/kg; found: 1.42 equivalents/kg.

EXAMPLES 14 to 21

Some of the poly-(carbonate-urethanes) with acrylic unsaturations which were obtained in the above examples were formulated to give photocrosslinkable compositions. The formulations used were as follows:

| | |
|---|---|
| unsaturated poly-(carbonate-urethane) | 80 parts by weight |
| vinylpyrrolidone | 20 parts by weight |
| benzophenone | 2.5 parts by weight |
| dimethylaminoethanol | 2.5 parts by weight |

The vinylpyrrolidone is a reactive solvent and the benzophenone/dimethylaminoethanol pair acts as a photoinitiator.

By way of comparison, an analogous composition was formulated by replacing the unsaturated poly-(carbonate-urethane) by an acrylic acid poly-(ester-urethane) which is obtained by condensing toluene diisocyanate and hydroxyethyl acrylate with a polyester-diol resulting from the condensation of 4 mols of adipic acid with 1 mol of butane-1,3-diol and 4 mols of hexane-1,6-diol.

An analogous composition was also formulated by replacing the unsaturated poly-(carbonate-urethane) by an acrylic acid polycarbonate obtained by reacting acrylic acid with a polycarbonate-diol obtained by the phosgenation of trimethylolpropane and a mixture of hexane-1,6-diol and butane-1,4-diol, and having a molecular weight of 1,000, the proportions of trimethylolpropane and diols being such that:

there is statistically one molecule of trimethylolpropane per polymer chain, and the resulting polycarbonate is equivalent to a mixture of 50% by weight of a polycarbonate obtained from trimethylolpropane and butanediol by itself and 50% by weight of a polycarbonate obtained from trimethylolpropane and hexanediol by itself.

These various formulations were spread on aluminium plates. Photocrosslinking was carried out by exposure on a fixed support under a UV lamp having a power of 80 watts/cm for a lamp length of 5 cm, that is to say a total power of 400 watts, the lamp-varnish distance being 7.5 cm. Each formulation was spread on three different supports which were subjected to respective irradiation times of 5 seconds, 10 seconds and 30 seconds. It was found that the films obtained from formulations based on unsaturated poly-(carbonate-urethanes) according to the invention possessed an adhesion to the support which was superior to that possessed by the films obtained from formulations based on acrylic acid poly-(ester-urethane). The Persoz hardness of the various films thus obtained was measured and the results are shown in Table III below.

TABLE III

| | | Persoz hardness | | |
|---|---|---|---|---|
| Example No. | Base polymer | After 5 seconds | After 10 seconds | After 30 seconds |
| 14 | Unsaturated poly-(carbonate-urethane) of Example 10 | 29 | 58 | 124 |
| 15 | Unsaturated poly-(carbonate-urethane) of Example 11 | 30 | 60 | 121 |
| 16 | Unsaturated poly-(carbonate-urethane) of Example 12 | 23 | 36 | 100 |
| 17 | Unsaturated poly-(carbonate-urethane) of Example 13 | 23 | 46 | 109 |
| 18 | Unsaturated poly-(carbonate-urethane) of Example 2 | 44 | 70 | 150 |
| 19 | Unsaturated poly-(carbonate-urethane) of Example 3 | 51 | 90 | 174 |
| 20 | Acrylic acid poly-(ester-urethane) | 15 | 24 | 49 |
| 21 | Acrylic acid polycarbonate | 18 | 32 | 34 |

We claim:

1. The compounds poly-(carbonate-urethanes) with acrylic unsaturations, of the formula

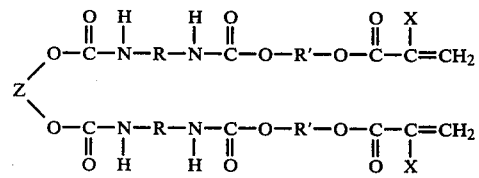

in which: X is hydrogen or methyl, R is a substituted or unsubstituted alkylene, cycloalkylene or arylene radical, R' is a lower alkylene radical, Z is a polycarbonate chain originating from a hydroxytelechelating, aliphatic or cycloaliphatic, linear polycarbonate having a molecular weight of between 500 and 3,000 and C,H,N and O respectively are carbon hydrogen, nitrogen and oxygen.

2. The compound poly-(carbonate-urethanes) with acrylic unsaturations, according to claim 1, which has the formula

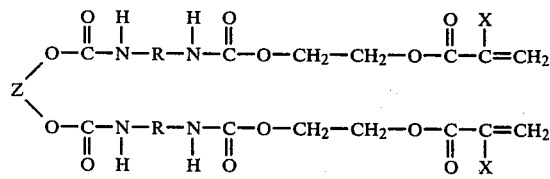

in which: X is hydrogen or methyl, R is a substituted or unsubstituted alkylene, cycloalkylene or arylene radical, Z is a polycarbonate chain originating from a hydroxytelechelating, aliphatic or cycloaliphatic, linear polycarbonate having a molecular weight of between 500 and 3,000 and C,H,N and O respectively are carbon, hydrogen, nitrogen and oxygen.

3. Photocrosslinkable compositions comprising an unsaturated polymer, an unsaturated monomer and a photoinitiator, wherein the said unsaturated polymer is a poly-(carbonate-urethane) with acrylic unsaturations, according to claim 1.

4. Photocrosslinkable compositions according to claim 2, wherein the said unsaturated monomer is a polyfunctional acrylate of low molecular weight.

5. Photocrosslinkable compositions according to claim 3, wherein the unsaturated monomer is a member selected from the group consisting of pentaerythritol triacrylate, trimethylolpropane triacrylate and hexane-1,6-diol diacrylate.

6. Photocrosslinkable compositions according to any one of claims 2 to 4, wherein the photoinitiator is chosen from the group comprising benzoin ethers, acetophenone derivatives, and benzophenone in a mixture with an amine.

7. Films obtained by the photocrosslinking of a composition according to any one of claims 3 to 6.

* * * * *